(12) United States Patent
Lagerwall et al.

(10) Patent No.: US 8,953,139 B2
(45) Date of Patent: Feb. 10, 2015

(54) STABILIZATION OF ANTIFERROELECTRIC LIQUID CRYSTALS

(76) Inventors: Sven T Lagerwall, Göteborg (SE); Per Rudquist, Göteborg (SE)

( * ) Notice: Subject to any disclaimer, the term of this patent is extended or adjusted under 35 U.S.C. 154(b) by 205 days.

(21) Appl. No.: 13/809,166

(22) PCT Filed: Jul. 8, 2011

(86) PCT No.: PCT/SE2011/050932
§ 371 (c)(1), (2), (4) Date: Jan. 9, 2013

(87) PCT Pub. No.: WO2012/005682
PCT Pub. Date: Jan. 12, 2012

(65) Prior Publication Data
US 2013/0107189 A1    May 2, 2013

Related U.S. Application Data

(60) Provisional application No. 61/362,709, filed on Jul. 9, 2010.

(51) Int. Cl.
*C09K 19/02* (2006.01)
*G02F 1/133* (2006.01)
*C09K 19/20* (2006.01)
*G09G 3/20* (2006.01)
*G09G 3/36* (2006.01)
*G02F 1/00* (2006.01)
*C09K 19/04* (2006.01)
*G02F 1/141* (2006.01)

(52) U.S. Cl.
CPC ........ *G02F 1/13306* (2013.01); *C09K 19/0266* (2013.01); *C09K 19/2021* (2013.01); *G09G 3/2007* (2013.01); *G09G 3/3651* (2013.01); *G02F 1/0045* (2013.01); *C09K 2019/044* (2013.01); *G02F 2001/1412* (2013.01); *G09G 2300/0491* (2013.01); *G09G 2310/08* (2013.01)
USPC .......................................................... 349/174

(58) Field of Classification Search
USPC .......................................................... 349/174
See application file for complete search history.

(56) References Cited

U.S. PATENT DOCUMENTS

| 2002/0075445 | A1 | 6/2002 | Dabrowski et al. |
| 2010/0258765 | A1 | 10/2010 | Dabrowski et al. |
| 2013/0107150 | A1* | 5/2013 | Lagerwall et al. ............. 349/33 |

OTHER PUBLICATIONS

International Search Report and Written Opinion issued in PCT/SE2011/050932 by Patent-och registreringsverket on Nov. 9, 2011.
(Continued)

*Primary Examiner* — Timothy L Rude
(74) *Attorney, Agent, or Firm* — Valea AB

(57) ABSTRACT

Example embodiments disclosed herein relate to the stabilization of the orthoconic state in orthoconic antiferroelectric liquid crystal devices. According to some of the example embodiments, the stabilization may be obtained by tuning a device cell as well as material parameters. The orthoconic state may be stabilized by means of the cell surfaces, electric fields, and/or polymer-stabilization, and combinations thereof, under selected conditions. The example embodiments presented herein advances several new working modes as well as new types of applications of orthoconic antiferroelectric liquid crystals.

26 Claims, 7 Drawing Sheets

(56) References Cited

OTHER PUBLICATIONS

Nayek P. et al; "Bias dependent relaxation in different phases . . . "; Current Applied Physics, vol. 10, No. 2 pp. 631-635, Elsevier, Mar. 2010.

Nayek P. et al; "Electro-optical and dielectric properties . . . "; Journal of physics D. Applied physics, vol. 42, No. 22, p. 225504, Nov. 21, 2009, IOP Publishing, Bristol, GB; abstract.

Rudquist P. et al; Polymer-stabilized orthoconic antiferroelectic liquid crystals; Ferroelectrics, vol. 344, pp. 177-188, 2006, Gordon & Breach, Switzerland,; abstract.

* cited by examiner

STABILIZATION OF ANTIFERROELECTRIC LIQUID CRYSTALS

RELATED APPLICATIONS

This application is a National Stage Entry under 35 U.S.C. §371 of International Application No. PCT/SE2011/050932, filed Jul. 8, 2011. The present application and the International application both claim the benefit of U.S. Provisional Application No. 61/362,709, filed on Jul. 9, 2010. The entire teachings of the above applications are incorporated herein by reference.

TECHNICAL FIELD

Example embodiments presented herein may be directed towards the stabilization of helix-free antiferroelectric liquid crystal structures. The stabilization may alter a relationship between the helical pitch and stabilization temperature of the antiferroelectric liquid crystal.

BACKGROUND

Since they were first reported in 1989 Antiferroelectric Liquid Crystals (AFLCs) have been considered very attractive for a number of electro-optic applications, foremost for high-resolution large area displays. In antiferroelectric liquid crystal displays (AFLCDs) the smectic $C_a^*$ phase liquid crystal is arranged in a bookshelf geometry, as is illustrated in FIG. 1A. When being in the surface-stabilized state and aligned in so-called bookshelf geometry conventional AFLCs are optically biaxial with their slow principal axis along the smectic layer normal. This gives a dark state when the cell is between crossed polarizers oriented parallel and perpendicular to the layer normal.

When a sufficiently strong electric field ±E is applied across the cell, the anticlinic ground state, with an alternating polarization direction in adjacent smectic layers, is forced to one of the two symmetrically situated synclinic states with the slow axis inclined at ±θ away from the layer normal, as is illustrated in FIG. 1B. This is the so-called field-induced transition from the antiferroelectric (AF) to the ferroelectric (±F) state. The switching occurs in domains and grayscale can be produced by controlling the ratio of bright ferroelectric F domains to dark antiferroelectric AF domains. When the field is taken away the AFLC relaxes back to the AF state. The AFLC is thus monostable, in contrast to the surface-stabilized ferroelectric liquid crystal (SSFLC) which is bistable.

So far, the idea to use AFLC materials in a display mode has been, in principle, to use three states of the optic axis lying in a plane, where the two field-on states have been stabilized by a holding voltage applied all the time. This is the so-called tri-state switching. Small video and large desktop computer prototype AFLC displays have been presented already during the 1990's but they were never commercialized. The main reason for this was the insufficient extinction obtained in the dark state.

AFLC materials are notoriously difficult to align in a high-quality bookshelf structure. Instead AFLC materials typically form an inhomogeneous smectic layer structure with local variations in the slow axis (the effective optic axis) orientation in the cell. These variations in the optic axis orientation cause light leakage in the dark state. One part of the alignment problem is the lack of a nematic phase in AFLC materials. Another is the tendency for the structure to break up under electronic addressing conditions. In the latter situation, the vertical chevron formed at the virgin cooling from the smectic A* to the tilted $SmC_a^*$ (sometimes via SmC*) is straightened up by the electric field and the AFLC now instead forms a "horizontal chevron structure".

In an attempt to solve the "dark state problem" Orthoconic Antiferroelectric Liquid Crystals (OAFLC) have been developed [1]-[4]. An OAFLC device features AFLC material satisfying the orthoconic condition. In order to satisfy the orthoconic condition, two properties are typically met. The first is a material property where the tilt angle in the anticlinic AF structure is approximately 45°, such that the directors in adjacent smectic layers are perpendicular. The second is a device property where the AF structure is surface-stabilized such that no trace of the helix is present. This second condition is harder to realize in the AFLC than in the FLC case.

The result is that if these two conditions are satisfied the AFLC changes from positive biaxial to negative uniaxial and with the optic axis perpendicular to the layer normal, and perpendicular to the tilt plane, instead of being along the normal. Thus, the AFLC may be in a uniaxial negative state with an oblate indicatrix. This is called the orthoconic condition or the horizontally surface-stabilized orthoconic AFLC state. The orthoconic darkstate is in principle just as good as the extinction of the polarizers, independent of alignment or misalignment, which is unique. Between crossed circular polarizers even the bright state is insensitive to alignment, which is equally unique.

SUMMARY

In order to obtain the orthoconic state the cell thickness should typically be of the order of or even smaller than the bulk helical pitch of the AFLC material. Currently, the pitch of available orthoconic AFLC mixtures is typically below 0.5 μm at room temperature. Thus, a cell thickness—the distance between the cell substrates—d of this order is needed to obtain the orthoconic condition. Such thin cells would cause severe manufacturing problems. Moreover, cells of such thickness tend to lead to another problem, in that the synclinic ferroelectric states often become metastable. This makes the back-relaxation from the bright to dark state very slow.

A main reason for the metastable F states is that the anticlinic and antipolar order of AFLCs is incompatible with all known surface conditions because both the director and the polarization would like to change periodically on a nanometer scale. Generally, a surface cannot allow this and thus promotes synclinic order of chiral smectics. This is partly because of the polar anchoring which makes one of the tilt states, with the spontaneous polarization $P_s$ pointing into (or out from) the surface, energetically favorable.

Thus, the relative difference in total energy between the AF and the F states of the AFLC cell strongly depends on the cell thickness in thin cells. In the case of a vertical chevron in the smectic layer structure, the cell may be considered as two cells in series, each having an effective thickness of d/2, with the chevron surface as an imaginary cell surface. A chevron surface is non-polar due to symmetry and thus supports both anticlinic and synclinic order. As a result of this, the barrier between the AF and F states become even higher in chevron cells and synclinic states can prevail for years if the chevron is never straightened out by the application of electric fields.

In solving the above mentioned problems, the effect from metastable synclinic states on both the static and the dynamic performance of orthoconic AFLCs must be reduced by going to a larger cell gap (which makes the helical pitch a crucial parameter) and by means of developing surfaces as neutral as possible to decrease polar anchoring strength.

Polymer-stabilization is today a technique used to speed up the response of nematic liquid crystal displays and to avoid disclinations. Polymer-stabilization may be used for speeding up the back-relaxation of orthoconic AFLCs cells, without using tailored waveforms [5].

The inventors herein have discovered novel uses for polymer-stabilization. Specifically, the inventors have discovered the use of polymer-stabilization in securing the orthoconic state in cells where the helical pitch is too small to provide the orthoconic state in working temperature ranges.

Thus, some of the example embodiments presented herein comprise the use of polymer-stabilization in new ways to secure the orthoconic state. Some of the example embodiments may comprise utilizing polymer-stabilization to preserve the surface-stabilized state under conditions where the cell normally would not be surface stabilized, and to stabilize a particular state to accomplish special functions for a variety of applications, for instance 3D-projectors and displays, and ultra-low-power displays.

In some example embodiments polymer-stabilization may be performed at a temperature where the pitch is long compared to a cell gap and the material is surface stabilized in the horizontal tilt plane state (HAF). Upon surface stabilization at this temperature, the helix free AF state may be secured by a polymer network, even at temperatures where the pitch would typically be too short to be in the HAF state by surface-stabilization alone.

In some example embodiments surface stabilization may be achieved at a temperature where the pitch is long compared to a cell gap. After the surface stabilization the temperature may be altered to a temperature where the long-pitch condition might no longer be fulfilled. The helix free AF state and especially the orthoconic state may then be metastable and temporarily preserved. Polymer stabilization may be performed after such a temperature change. After the polymer stabilization the helix free AF state and especially the orthoconic state may be secured by a polymer network and stable, even at temperatures where the pitch would typically be too short.

In some example embodiments a high-frequency electric field, which unwinds the helix and produces a helix free state, may be applied before or during a polymer-stabilization process. After the polymer-stabilization, the helix free state may be preserved in the absence of the high-frequency field due to the stabilization provided by the polymer network. Thus, the orthoconic state may be secured even if the pitch of the material may be too short to be surface stabilized by ordinary means.

Some of the example embodiments may be directed towards a method for securing a stabilization of a liquid crystal device, the liquid crystal device may comprise an antiferroelectric liquid crystal material having smectic layers, and two substrates confining said antiferroelectric liquid crystal material. The method may comprise introducing a stabilization agent to the antiferroelectric liquid crystal material, stabilizing the antiferroelectric liquid crystal material with the stabilization agent, and inducing a stabilized orthoconic state wherein the antiferroelectric liquid crystal is uniaxial negative and comprises an optic axis perpendicular to the substrates. The method may further comprise the alteration of a relationship between the helix pitch and a stabilizing temperature. The alteration may be provided as a function of the induced stabilization.

The method may further comprise introducing the stabilization agent in the form of a reactive monomer. In some example embodiments the reactive monomer may be a commercial diacrylate reactive liquid crystal monomer (e.g., RM82 by MERCK®). In some example embodiments the stabilization agent may further comprise a monomer and photoinitiator mixture. In some example embodiments the photoinitiator may be IRGACURE 651 by Ciba®.

The method may further comprise chemical crosslinking the reactive monomer at a selected temperature in which the antiferroelectric liquid crystal material is surface stabilized (e.g., at room temperature).

The method may further comprise chemical crosslinking the reactive monomer at a selected temperature, for example 25° C., in which the selected temperature is lower or higher than a temperature at which the antiferroelectric liquid crystal material is surface stabilized.

The method may further comprise introducing the stabilization agent in the form of an electric field comprising a field of a higher frequency than a cut off frequency (e.g., in the order of 100 kHz) of an antiphase fluctuation of the antiferroelectric liquid crystal material.

The method may further comprise introducing an additional stabilization agent, which may be different than the first stabilizing agent, in the form of a reactive monomer, wherein the stabilization further comprises chemical crosslinking the reactive monomer during an application of the electric field.

In some example embodiments the application of the electric field may further comprise applying the electric field during a cooling from a temperature at which the antiferroelectric liquid crystal is surface stabilized to a selected temperature at which the crosslinking of the reactive monomer is performed, wherein the applied electric field comprises a higher frequency than a cut off frequency of an antiphase fluctuation of the antiferroelectric liquid crystal material.

The method may further comprise providing a global energy minimum in the antiferroelectric liquid crystal material, wherein the helix free AF state and especially the orthoconic state remains stabilized after the electric field is removed.

The method may further comprise inducing an effectively tri-stable (e.g., comprising ±F and AF states) condition in the antiferroelectric liquid crystal material.

The method may further comprise locally stabilizing the antiferroelectric liquid crystal material. In some example embodiments the local stabilization may comprise applying an electric field in a localized region of the antiferroelectric liquid crystal material.

The method may further comprise the liquid crystal device comprising a cell thickness within a range of 0.5 µm-20 µm, 0.5 µm-5 µm, or within a range of 5 µm-20 µm.

In some example embodiments the antiferroelectric liquid crystal material may be W182 or W193B.

Some example embodiments may be directed towards a liquid crystal device, the liquid crystal device comprising an antiferroelectric liquid crystal material having smectic layers, and two substrates confining said antiferroelectric liquid crystal material. The liquid crystal device may further comprise a stabilization agent, said stabilization agent being introduced to the antiferroelectric liquid crystal material for stabilization; wherein said stabilization induces a stabilized orthoconic state wherein the antiferroelectric liquid crystal is uniaxial negative and comprises an optic axis perpendicular to the substrates; and wherein a relationship between the helix pitch and a stabilizing temperature is altered as a function of the induced stabilization.

The device may further be configured to be stabilized by performing any of the method steps discussed above.

BRIEF DESCRIPTION OF THE DRAWINGS

The foregoing will be apparent from the following more particular description of the example embodiments, as illus

DETAILED DESCRIPTION

Figure 1B:
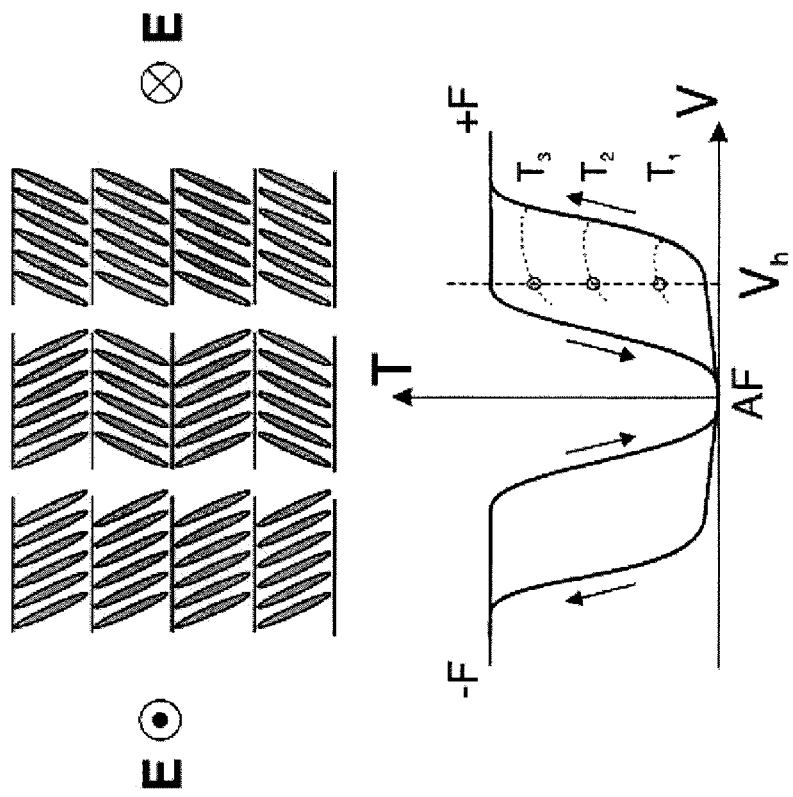
FIG. 1B is an illustrative example of the switching and electro-optic characteristics of the cell of FIG. 1A.
Figure 1A:
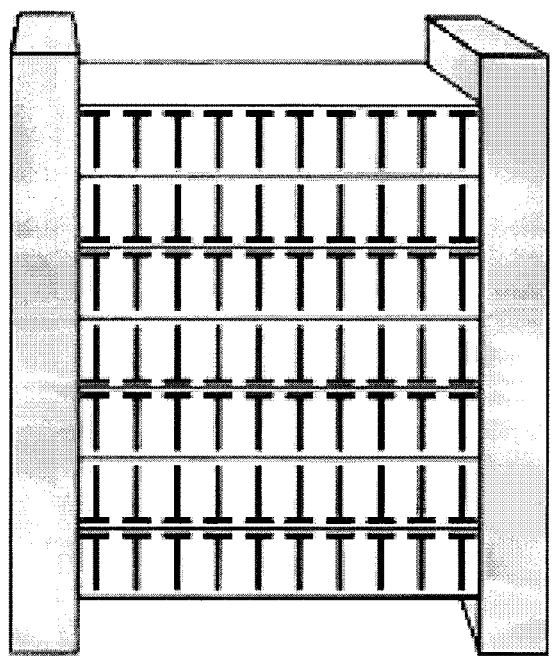
- FIG. 1A is an illustrative example of the geometry properties of an antiferroelectric liquid crystal cell in the HAF state.

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Stabilization of the Orthoconic State

In antiferroelectric liquid crystals (e.g. smectic $C_a^*$), molecular chirality makes the anticlinic structure form a helix along the smectic layer normal z. The undisturbed helical state is positively uniaxial with the optic axis along z. In the surface stabilized state the helix is suppressed or unwound by the action of the bounding surfaces (horizontal tilt plane—HAF). This unwound state can be obtained by using surface layers giving planar anchoring of the surface director, and making the cell gap small relative to the helix pitch of the orthoconic AFLC material. This is referred to herein as the long-pitch condition. The inherent helical structure is incompatible with the planar surface anchoring conditions and close to the surfaces the helix is therefore unwound. In thin enough cells the influence from the surfaces may dominate the behavior also in the bulk and the helix may be suppressed also in the volume of the cell. In the case of an orthoconic AFLC material the HAF state produces a negatively uniaxial structure with the optic axis perpendicular to the tilt plane (orthoconic condition). This is an example of a surface-stabilized orthoconic AFLC with the optic axis perpendicular to the cell plates, and the typical orthoconic AFLC device geometry.

But even if the surface-stabilized state is the ground state, metastable states can appear where the tilt-plane is not parallel to the glass plates. For instance, there could be remnants of the helical structure or regions where the tilt plane is not horizontal but essentially vertical, especially after switching. Therefore, a need exists to further stabilize Orthoconic AFLC devices.

Some example embodiments presented herein may relate to specific procedures of how to achieve and stabilize the orthoconic state in device cells where the pitch of the orthoconic AFLC is too small to allow for pure surface-stabilization of the orthoconic state. This may allow for the use of orthoconic AFLCs in devices featuring thicker cell gaps, allowing for optimization of the performance (e.g. half-wave plate condition) at visible wavelengths, or in the infrared, or even terahertz regions, as well as in switchable dielectric media for microwave electronics.

Some example embodiments may relate to active stabilization and destabilization of the orthoconic black state and the bright synclinic states, in particular to tuning the balance between the ferroelectric and antiferroelectric order in orthoconic AFLCs and AFLCs in general. This would allow not only for new types of electrooptic devices but, in a different region of the parameter space, truly tristable antiferroelectric devices, which may consume power only during update periods.

According to some of the example embodiments, additional stabilization may be provided in the form of polymer based stabilization securing the helix free AF state and especially the orthoconic condition. Some example embodiments may be directed towards providing additional stabilization via an applied electric field.

Polymer Stabilization of AFLC in the Orthoconic State

Some example embodiments may be directed to the polymer stabilization of an AFLC in an orthoconic state. In some example embodiments, the polymer stabilization of the AFLC may take place at a temperature where the bulk pitch is long compared to the cell gap. In some example embodiments, the polymer stabilization of the AFLC may take place at a temperature where the orthoconic state is metastable.

An example AFLC material that may be employed is the orthoconic mixture W182 or W193B, which may be provided from the Dabrowski research group in Warsaw. The phase sequence of W182 is $SmC^*_A$–99° C.–$SmC^*$–115° C.–SmA–120° C.–Iso. W182 and W193 are both mixtures of different molecules according to this formula.

An example illustration of W182 is provided below, where $P_1$ and $P_2$=1 and 2, or 2 and 1, respectively, and n is an integer. It should be appreciated that $P_1$ and $P_2$ may take any value such that $P_1+P_2=3$.

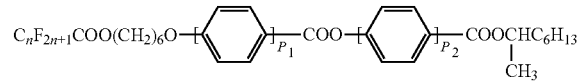

The value of the AFLC helical pitch is generally a function of temperature. In the W182 or W193B mixture, the pitch varies from about 0.4 μm at room temperature to >1 μm at ~80° C. This means that the critical cell gap for surface-stabilization is a function of temperature. Consequently, for a certain cell thickness this material may be sufficiently surface-stabilized at high temperatures, but the surface-stabilization may be lost, or become metastable, when cooling to the working temperature of the device, e.g. room temperature.

By performing the polymer-stabilization (e.g., chemical crosslinking of the added reactive monomer) at a temperature, where the material is indeed surface-stabilized, the helix-free state may be secured also at temperatures where the cell would not be surface-stabilized. Here the polymer-stabilization ensures that the anticlinic state is helix-free in the whole temperature range, e.g. from 0° C. to 80° C., of the AFLC. As the orthoconic state is now stabilized no, or limited number of, helical or unwanted metastable domains may exist in absence of electric fields at any temperature.

According to some example embodiments the orthoconic AFLC mixtures (e.g., W182 or W193B) may be mixed with a monomer/initiator mixture. In some example embodiments the monomer may be a commercial diacrylate reactive liquid crystal monomer with a nematic phase between 80° C. and 112° C. (e.g., RM82 from MERCK®), which may which polymerize to form across-linked network. The photoinitiator may be, for example, IRGACURE 651 from Ciba®. The relative concentration of the photoinitiator to reactive monomer may be about 10:90 wt %.

Upon mixture, the cells may be subsequently cooled down from the isotropic phase under a temperature gradient assuring that the transition from isotropic phase to smectic A* phase started at the rubbed surface. This procedure may result in an essentially homogeneous smectic layer alignment. Due to the surface electroclinic effect, the smectic layer normal may not be collinear but may comprise an angle of about 15° with the rubbing direction.

In some example embodiments, the cells may be electronically addressed by using, for example, a bipolar ac voltage with slowly decreasing amplitude, from above the threshold for switching from the antiferro- to the ferroelectric states down to zero. This may produce a surface-stabilized horizontal tilt plane structure, identified by its good extinction irrespective of the cell orientation between crossed polarizers. The cells may then be illuminated by UV-light at a selected temperature using, for example, a 200 W Leitz microscope UV-lamp at a distance of 10 cm for about 10 minutes. The selected temperature is one where the helix-free condition is fulfilled.

Using polymer-based stabilization, according to some of the example embodiments; the static and dynamic performance of the polymer-stabilized surface-stabilized orthoconic AFLC may be preserved in a wide temperature interval, even far away from the temperature region where the long-pitch condition is valid.

Furthermore, instead of having to design an orthoconic AFLC material, which fulfills the long-pitch condition in the entire working temperature range of the display, using the example embodiments it is enough to have a sufficiently long pitch in the temperature interval where the stabilization is performed.

Also, the example embodiments directed towards polymer-stabilization of the surface-stabilized orthoconic AFLC at a temperature where long-pitch condition is fulfilled, allows for the use of orthoconic AFLCs in devices working at longer wavelengths outside the range of visible light (e.g. in the infrared region) where the orthoconic AFLC cell or device is typically required to be significantly thicker to fulfill the optical and electrooptical requirements for the device.

Electric Field-Stabilization of AFLC in the Orthoconic State

Some example embodiments may be directed towards electric-field stabilization of an AFLC in an orthoconic state. The antiferroelectric switching typically used in AFLCDs (i.e., the switching from the dark antiferroelectric to the bright ferroelectric states) is a result of the torque on the spontaneous polarization P of each smectic layer from the electric field E.

Generally, the torque P×E wants to turn $P_i$ and $P_{i+1}$ of the $i^{th}$ layer in opposite directions causing an "antiphase" distortion of the anticlinic state. When the azimuthal director positions on the smectic cone in adjacent layers i and i+1 are separated by 180°, the polarizations of these layers are antiparallel and thus there is no net polarization, i.e. $P_i+P_{i+1}=0$. But a finite antiphase distortion of the anticlinic state gives a non-zero resulting polarization component $P_{net}=P_i+P_{i+1}\neq 0$ along the bisector of $P_i$ and $P_{i+1}$. With increasing amplitude of E, the antiphase distortion increases and the increasing $P_{net}$ aligns with the field due to the torque $P_{net}\times E$. For small fields, where the antiphase distortion is small, it means that the (anticlinic) tilt plane wants to turn parallel to the electric field. At a high enough field the polarization of all layers point along E and $P_{net}=2P_i$ which corresponds to the synclinic state.

Some of the example embodiments may be directed towards a new method to obtain the orthoconic state, utilizing the frequency dependence of the dielectric properties of AFLCs. The antiphase fluctuation mode has a cut-off in frequency above which the torque P×E may not induce the antiphase distortion with the resulting $P_{net}\neq 0$. For present OAFLCs the cut-off frequency is in the order of 100 kHz. Hence, above this cut-off, the torque on the tilt plane from the spontaneous polarization may be lost. The dominating dielectric response above the cut-off may instead be governed by the dielectric anisotropy of the AFLC in the director frame, i.e. the relative values of $\in_1$, $\in_2$, and $\in_3$, where 1, 2, and 3 represent the directions perpendicular to n and parallel to the tilt plane, perpendicular to n and normal to the tilt plane, and parallel to the director n, respectively. If $\in_2$ is larger than $\in_1$, which is the normal case, the director and hence the tilt plane will want to align themselves perpendicular to the oscillating field.

Figure 2:
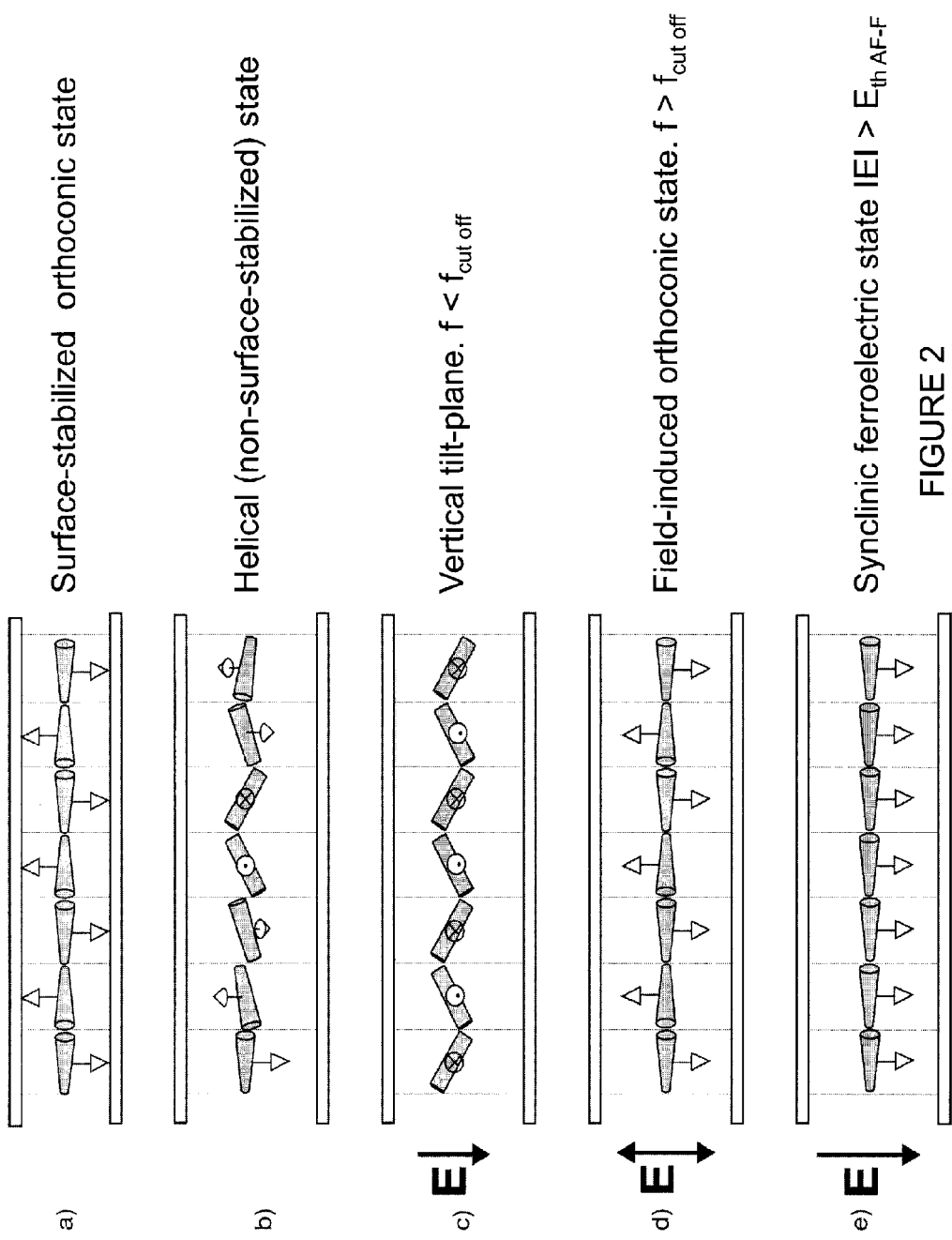
FIG. 2 depicts illustrative examples of the effects of an induced electric field in an antiferroelectric liquid crystal cell; illustration c) exemplifies the action of a low frequency (LF) field; illustration d) exemplifies the action of a high frequency (HF) field.

FIG. 2 depicts the effects of an induced electric field on an AFLC cell with the use of example illustrates a)-e). Example illustration a) depicts a purely surface-stabilized orthoconic AFLC cell with no electric field present. The material shown in illustration a) fulfills the long pitch condition. Example illustration b) depicts the orthoconic AFLC cell, with no electric field present, when the long pitch condition is not fulfilled, thus the material adopts a helical (non-surface-stabilized) configuration. The loss of the long pitch condition may be caused by, for example, temperature changes.

Example illustration c) depicts an applied electric field below the cut-off frequency for antiphase motion. The application of such a field may result in an AFLC device with an unwind helix structure due to the torque on $P_{net}$ and the tilt plane may be aligned parallel to the applied field.

Example illustration d) depicts the AFLC cell where high frequencies of the field ($f>f_{cut\ off}$) are applied. The applied field in illustration d) is also less than the threshold $E_{th}$. The resulting device of illustration d) may comprise a non-polar dielectric torque which may dominate over the torque on $P_{net}$ and the tilt-plane may therefore align perpendicular to the field. Example illustration d) depicts a new field-induced horizontal orthoconic state. Example illustration e) illustrates the fact that a high frequency field ($f>f_{cut\ off}$) stabilizes the horizontal synclinic state as well as the horizontal anticlinic state. The resulting AFLC cell may comprise the characteristics of the cell shown in example illustration d), and the cell may also be in a synclinic ferroelectric state.

Hence, at low frequencies (LF) where the antiphase distortion is activated by P×E, the response of the tilt-plane may be to be positioned parallel to E, while at high frequencies (HF), the tilt plane may be positioned perpendicular to E. A direct result of the latter is that the tilt plane of the antiferroelectric liquid crystal may be actively driven into the cell plane by applying an electric field with sufficiently high frequency (HF-mode).

Now consider the case of an applied electric field perpendicular to the smectic layer normal of a non-surface-stabilized $SmC_a^*$ liquid crystal, schematically described in example illustration d).

At low frequencies the structure will start to distort in a sense that the regions where the tilt plane is parallel to the field will grow and at a high enough field (but still smaller than the threshold field for AF-F switching) the helix may be completely unwound with the plane comprising the director (tilt plane) parallel to the field direction, as shown in example illustration c).

At high frequencies, on the other hand, where the dielectric properties are governed by the dielectric anisotropy, the regions where the tilt plane is perpendicular to the field may grow and at a high enough field the helix may be completely unwound with the plane of the director perpendicular to the field direction, as shown in example illustration d). This represents the same optical state as a surface-stabilized orthoconic AFLC cell. One important difference is that here the orthoconic state is field-induced.

Thus, some of the example embodiments may utilize high frequency fields to turn the director-plane of the anticlinic $SmC_a^*$ structure to be perpendicular to the applied field, regardless of the initial position of the tilt plane in a bookshelf type cell.

Some of the example embodiments may also be utilized to actively stabilize the helix free state with the tilt plane parallel to the device cell substrates by applying a high frequency field.

Some of the example embodiments may be utilized to actively induce and stabilize the orthoconic state by means of an ac electric field.

Some of the example embodiments may be utilized to induce an orthoconic state by applying high frequencies, which may provide a global energy minimum in the device cell, thus after switching the high frequency field off the orthoconic state may remain surface-stabilized. Specifically, some example embodiments may be directed towards a high frequency induced helix-free state with the tilt plane parallel to the cell plane, which may be further stabilized with the use of polymer stabilization to provide a global minimum in energy.

Some example embodiments may be utilized to locally remove regions in the cell comprising the helical structure or where the tilt plane is not parallel to the cell plane by applying a concentrated high frequency field.

Some example embodiments may be directed towards a high-frequency induced orthoconic state, which may also be possible in thick cells where surface-stabilization of the orthoconic AFLC is typically difficult.

Some example embodiments may be directed towards a high frequency field induction of the orthoconic state, which may be utilized in addressing antiferroelectric and orthoconic antiferroelectric devices.

Some example embodiments may be directed towards stabilizing the synclinic states after switching to the F state with, for example, a DC pulse. (HF of frequency much higher than the limit for polar ±F switching) This in principle opens up for a new type of electronic addressing of both orthoconic and conventional AFLC devices, an example of which is provided below:

1) Switching AF-F by a DC-pulse
2) An HF-field applied on the whole display/device stabilizes the written state of all pixels, both the dark state and the two bright states. In other words, the written picture is stabilized by a "holding HF-voltage"
3) Switching F-AF: remove HF. After relaxation to AF (helix or not) the HF can be applied again to stabilize the helix-free anticlinic state.

Active Stabilization and Destabilization of the Orthoconic State by Combinations of Polymer and Electric-Field Induced Methods The dynamics of the switching between the AF and F states in OAFLC devices is to a large extent dependent on the energy difference between the two states and the energy barrier separating the two states. If there is no local minimum for the F-state (i.e., no energy barrier) and a large difference between the high energy F-state and the low energy AF state, the relaxation from F to AF may be fast, and the switching from AF-F and F-AF may occur with very small or essentially no hysteresis. If the energy barrier is high and/or the difference in energy between the two states is small, the back relaxation may be slower, and in the case of an energy barrier, there will be hysteresis.

With the use of polymer-stabilization, according to some of the example embodiments, the balance between the AF and the F states may be shifted. If the polymer stabilization is carried out in the synclinic ferroelectric state, this state may become stabilized.

According to some example embodiments the orthoconic AFLC mixtures (e.g., W182) may be mixed with a monomer/initiator mixture. In some example embodiments the monomer may be a commercial diacrylate reactive liquid crystal monomer with a nematic phase between 80° C. and 112° C. (e.g., RM82). The photoinitiator may be, for example IRGACURE 651. The relative concentration of the photoinitiator to reactive monomer may be about 10:90 wt %.

Upon mixture, the cells may be subsequently cooled down from the isotropic phase under a temperature gradient assuring that the transition from isotropic phase to smectic A* phase started at the rubbed surface. This procedure may result in an essentially homogeneous smectic layer alignment.

In some example embodiments, the cells may be electronically addressed by using, for example, a bipolar ac voltage with slowly decreasing amplitude, from above the threshold for switching from the antiferro- to the ferroelectric states down to zero. This may produce a non-optimal AFLC structure with for example remnants of the intrinsic helix and/or non-horizontal tilt planes. This may be due to that the material pitch is too short compared to the cell gap, and the structure may not be surface stabilized. A high frequency electric field, for example above 100 kHz, may be applied between the cell electrodes. This procedure may unwind the intrinsic helix and/or turn the tilt planes parallel to the cell plane. This may produce a horizontal orthoconic state. The cells may then be illuminated by UV-light. The orthoconic state may then be preserved even after the field is removed.

Above, example embodiments relating to polymer and electric-field based stabilization presented ways of stabilizing the AF and F states with surfaces and electric fields. By careful tuning of the liquid crystal material, surface-conditions, polymerization conditions, and the type and concentration of reactive monomer in relation to the used antiferroelectric liquid crystal host, the balance between the AF and F to make the two states have essentially the same energy may be tuned, with a suitable energy barrier in between. Thus, it is possible to make a truly tri-stable AFLC display (i.e., AF and ±F). In such a display both the black AF state and the two symmetric white ±F states may be inherently stable without a holding voltage applied, in contrast to prior art devices.

Utilizing some of the example embodiments presented herein an AFLC display with similar functionality as a bistable FLC display may be provided. Specifically, the AFLC display does need to have information continuously updated but the information may instead stay infinitely. Additionally, with the AFLC device new information may be written without specially designed pulses for DC-compensation, which is not possible in FLC displays.

This kind of device, intended for displays that do not need to be updated very often, may be referred to a "zero power display" or a "close to zero power display". Its physical background might be explained in the following. Any surface shifts the balance between ferroelectric and antiferroelectric order as the surface promotes synclinic, polar order instead of the anticlinic antipolar order of the AFLC. In thin cells, the antiferroelectric smectic $C_a^*$ phase can be completely squeezed out by the surfaces in favor of the ferroelectric (smectic C*) state.

Utilizing some of the example embodiments, the cell parameters may be tuned to make the antiferroelectric ground state and the two field-induced ferroelectric states have essentially the same energy (i.e., a structure that has three stable states in absence of an applied electric field). This new structure has an interesting application potential as it combines useful properties of ferroelectric and antiferroelectric liquid crystals, with bistability of the former and the superior black state plus DC-balanced driving from the latter.

Specifically, the new truly tristable orthoconic AFLC device consumes power only during an update. Once the information of a (static) image is written, it remains without any power applied until the next image is written. Thus, tristable orthoconic displays may be useful for e-book readers and other static displays.

It should be appreciated that the polymer stabilization may be carried out at different conditions in different parts (or even pixel by pixel) of a display/device. This allows for the local setting of the ground state (AF- or F), and the threshold-voltages in single pixels which adds to the grey-scale capability of such tristable orthoconic AFLC displays.

It should also be appreciated that with the use of active and local, tuning of AF and F energies, a static zero-field image may be locked in by means of photopolymerization. The display may still be switchable to bright or black states, but the stored picture is retained when the device is switched off.

WORKING EXAMPLES

Figure 3:
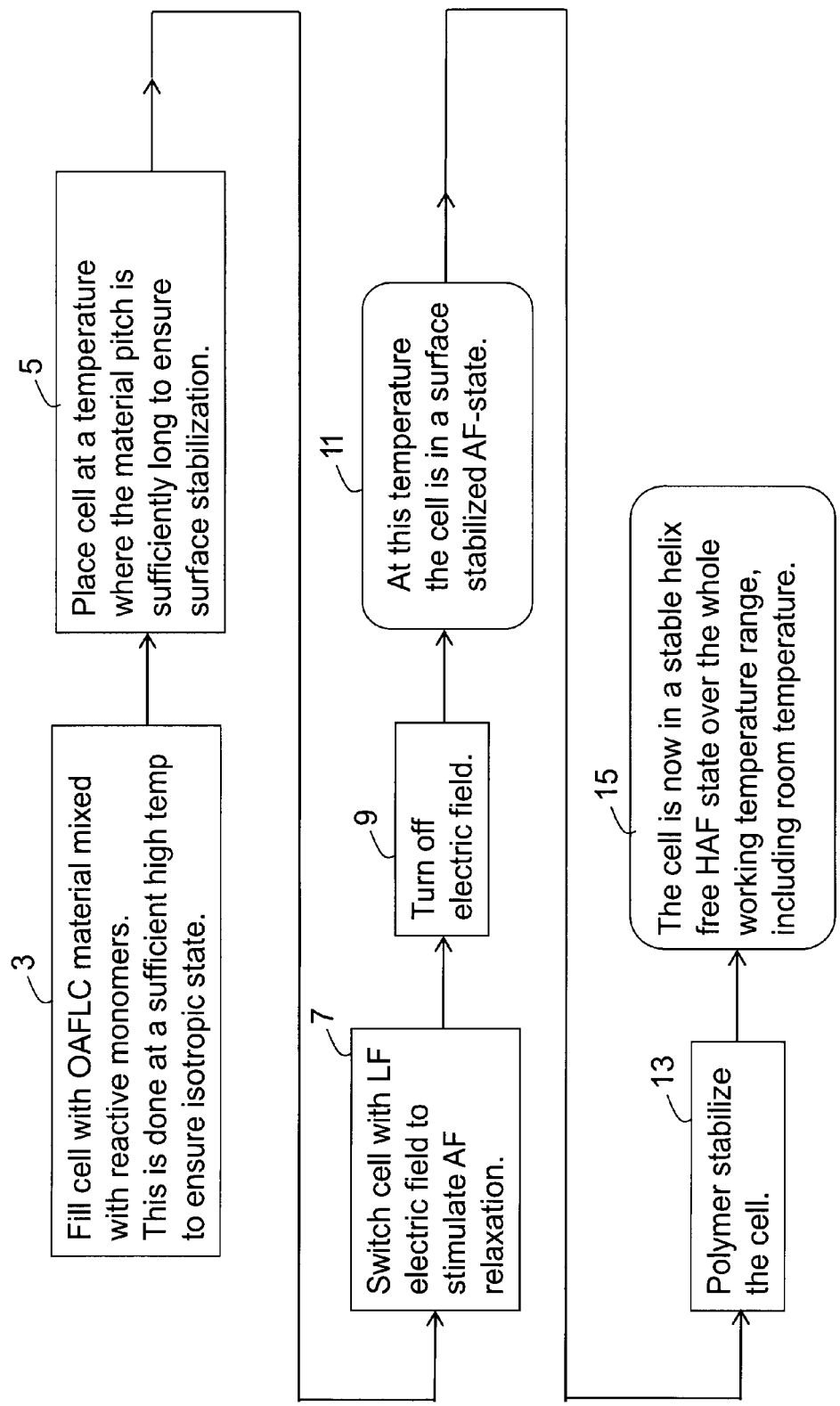
FIG. 3 is a flow diagram depicting example operations of polymer stabilization at a high temperature, according to some of the example embodiments.
Figure 4A:
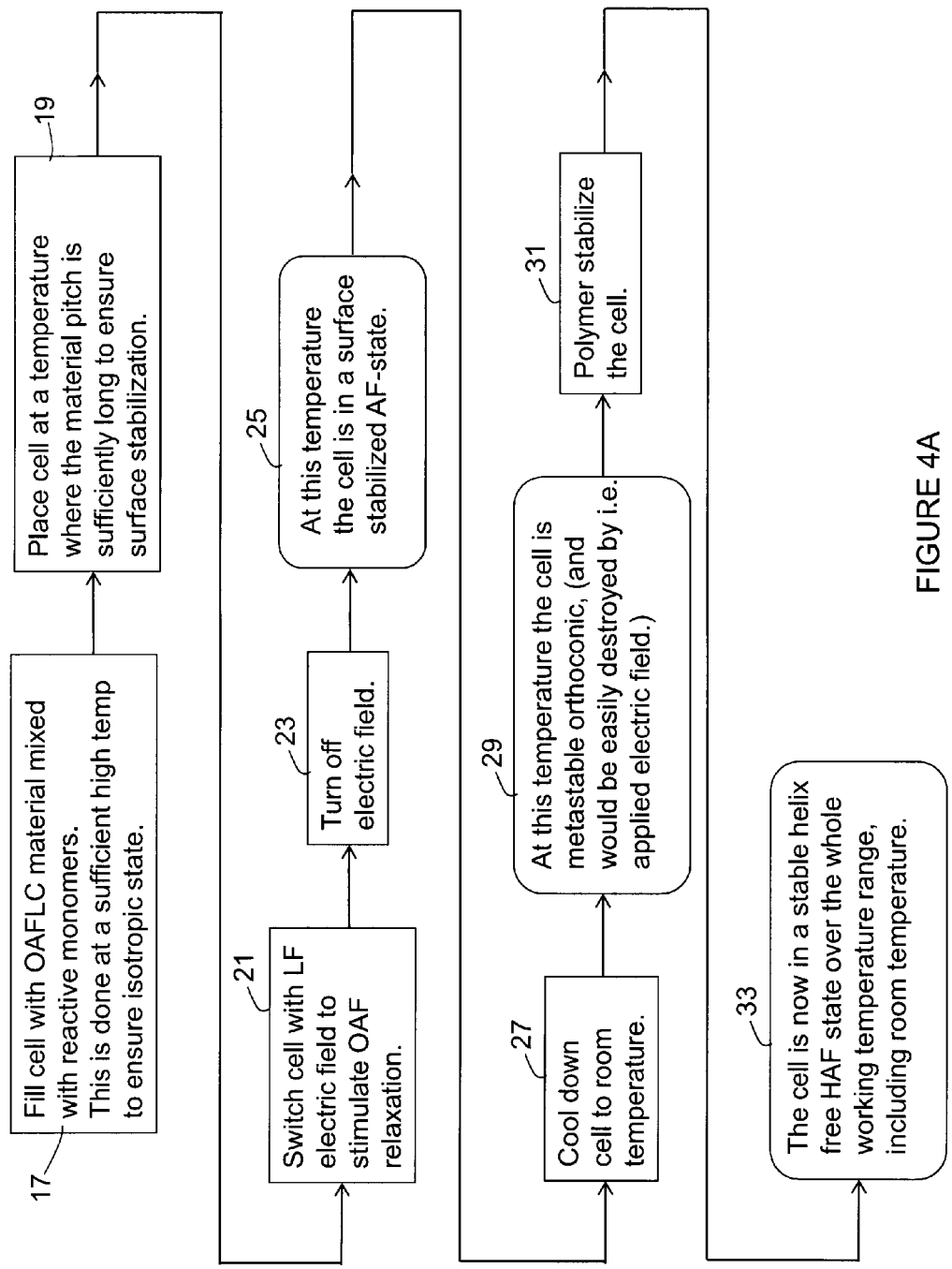
FIG. 4 is a flow diagram depicting example operations of surface stabilization at a high temperature and polymer stabilization at a different temperature, according to some of the example embodiments.
Figure 4B:
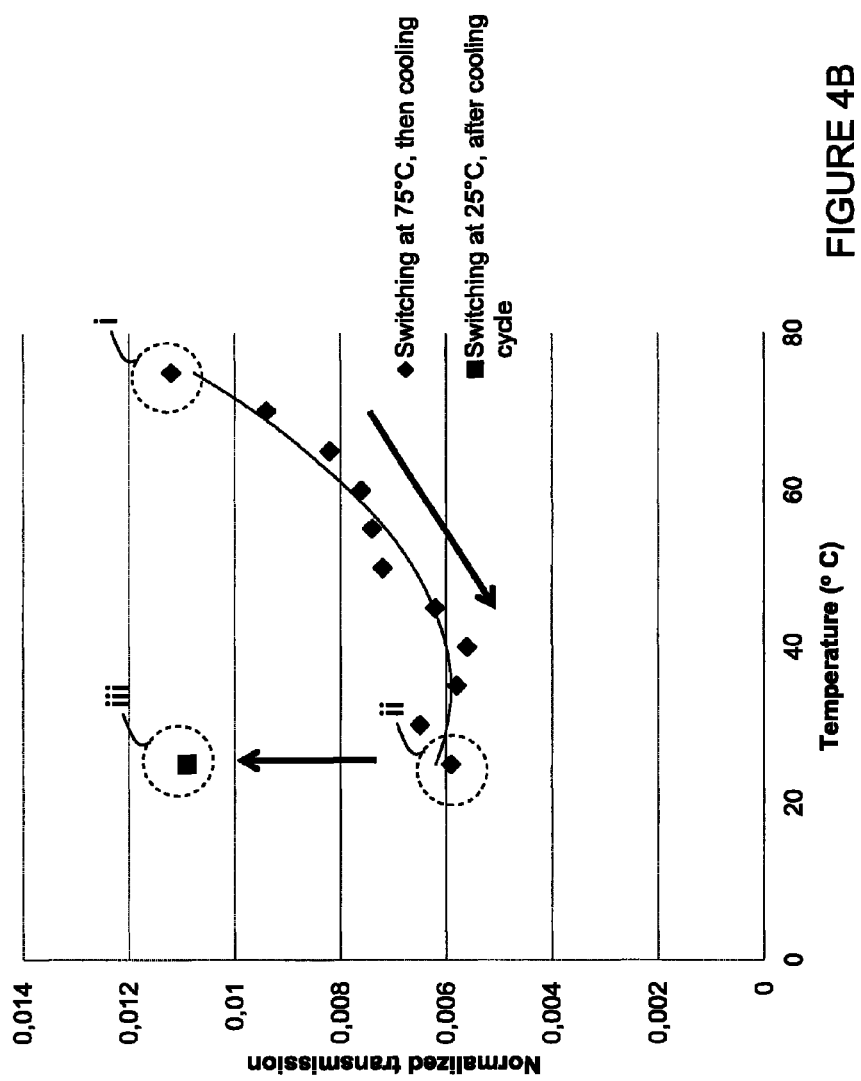
Figure 5:
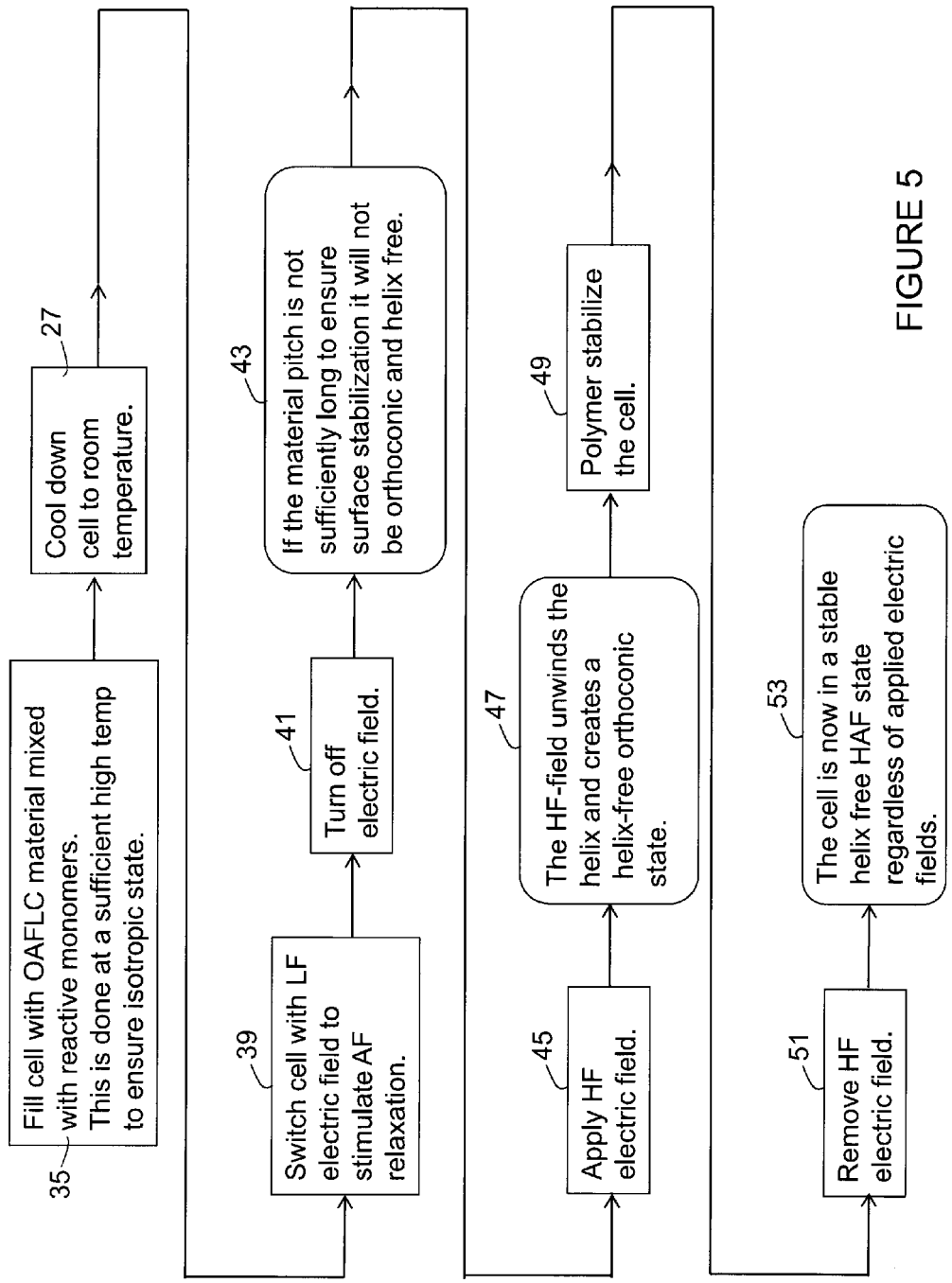
FIG. 5 is a flow diagram depicting example operations of the application of a high frequency electric field followed by polymer stabilization, according to some of the example embodiments.

FIGS. 3-5 illustrate flow diagrams depicting example operations which may be taken when utilizing the example embodiments presented herein. FIG. 3 illustrates example operations for polymer stabilization at high temperatures. As shown in FIG. 3, first a cell may be filled with an OAFLC material which may be mixed with reactive monomers (3). This step may be performed at a sufficiently high temperature to ensure an isotropic state, for example 130° C. Thereafter, the cell may be placed at a temperature where the material pitch is sufficiently long to ensure surface stabilization (5), for example 75° C. The cell may then be switched with a low frequency electric field to stimulate AF relaxation (7). The electric field may thereafter be turned off (9). At this temperature, the cell may be in a surface stabilized AF state (11), Upon being in the surface stabilized state, the cell may be polymer stabilized, utilizing any of the methods discussed above, for example (13). After polymer stabilization, the stable helix free HAF state of the cell may be maintained during a wider range of temperature (e.g., over the entire working temperature range) (15). Thus, as a result of the polymer stabilization, the relationship between the helix pitch and the stabilization temperature has been altered. Specifically, the temperature range in which the cell is in the orthoconic state (e.g., comprises an unwound helix) is larger as a result of the stabilization.

FIG. 4A illustrates example operations for surface stabilization at a high temperature, and polymer stabilization at another temperature. First, a cell may be filled with OAFLC material which may be mixed with reactive monomers (17). The filling may be performed at a sufficiently high temperature to ensure an isotropic state, for example 130° C. Thereafter, the cell may be placed at a temperature where the material pitch is sufficently long to ensure sufrace stabilization (19), for example 75° C. Then, the cell may be switched with a low frequency electric field to stimulate AF relaxation (21). The electric field may thereafter be turned off (23). At this temperature, the cell may be in a surface stabilized HAF state (25). The cell may thereafter be cooled down to room temperature (27). At room temperature, the cell may be in a metastable orthoconic state, and may therefore be destroyed by an applied electric field (29) or with time. The cell may be polymer stabilized in the metastable state, as discussed above, for example (31). After polymer stabilization, the cell may be in a stable helix free HAF state over the entire working temperature range, including room temperature (33). Thus, the relationship between the helix pitch and the stabilization temperature has been altered.

FIG. 4B illustrates a graph showing the result of surface stabilization at high temperature followed by cooling and the resulting metastable orthoconic state. The normalized transmission of a cell filled with a material, for example W-182, where the cell gap is too large compared to the pitch to induce a surface stabilized helix free HAF state at for example 25° C. may be seen as in FIG. 4B. When the cell is heated to 75° C. and switched by, for example a 100 Hz pulse, it may relax to a helix free surface stabilized HAF state (i). When cooling the cell the transmission may decrease, for example due to tilt angle dependency of temperature. After cooling, the material may be in a metastable orthoconic state (ii), showing a low transmission. The state may be destroyed by, for example a 100 Hz pulse, which may introduce for example helix and/or non-vertical tilt planes. This may be identified by increased birefringence and hence higher transmission (iii). Before applying any destructive field, as may be done when driving the device, polymer stabilization may be performed. The helix free HAF state (ii) may then become stable.

FIG. 5 illustrates example operations for the application of a high frequency field and polymer stabilization. First, the cell may be filled with OAFLC material mixed with reactive monomers (35). This may be performed at sufficent high temperatures to ensure the isotropic state, for example 130° C. Thereafter, the cell may be cooled down to room temperature (37). The cell may then be switched with a low frequency electric field to stimulate AF relaxation (39). The electric field may thereafter be turned off (41). If the material pitch is not sufficiently long to ensure surface stabilization, it will not be helix free (43). Thus, a high frequency electric field may be applied (45). The high frequency field may unwind the helix and create a helix-free orthoconic state (47). The cell may thereafter be polymer stabilized (49). Upon polymer stabilization, the high frequency electric field may be removed (51). The cell may thereafter be in an orthoconic stabilized state regardless of whether or not an electric field is being applied (53).

Figure 6:
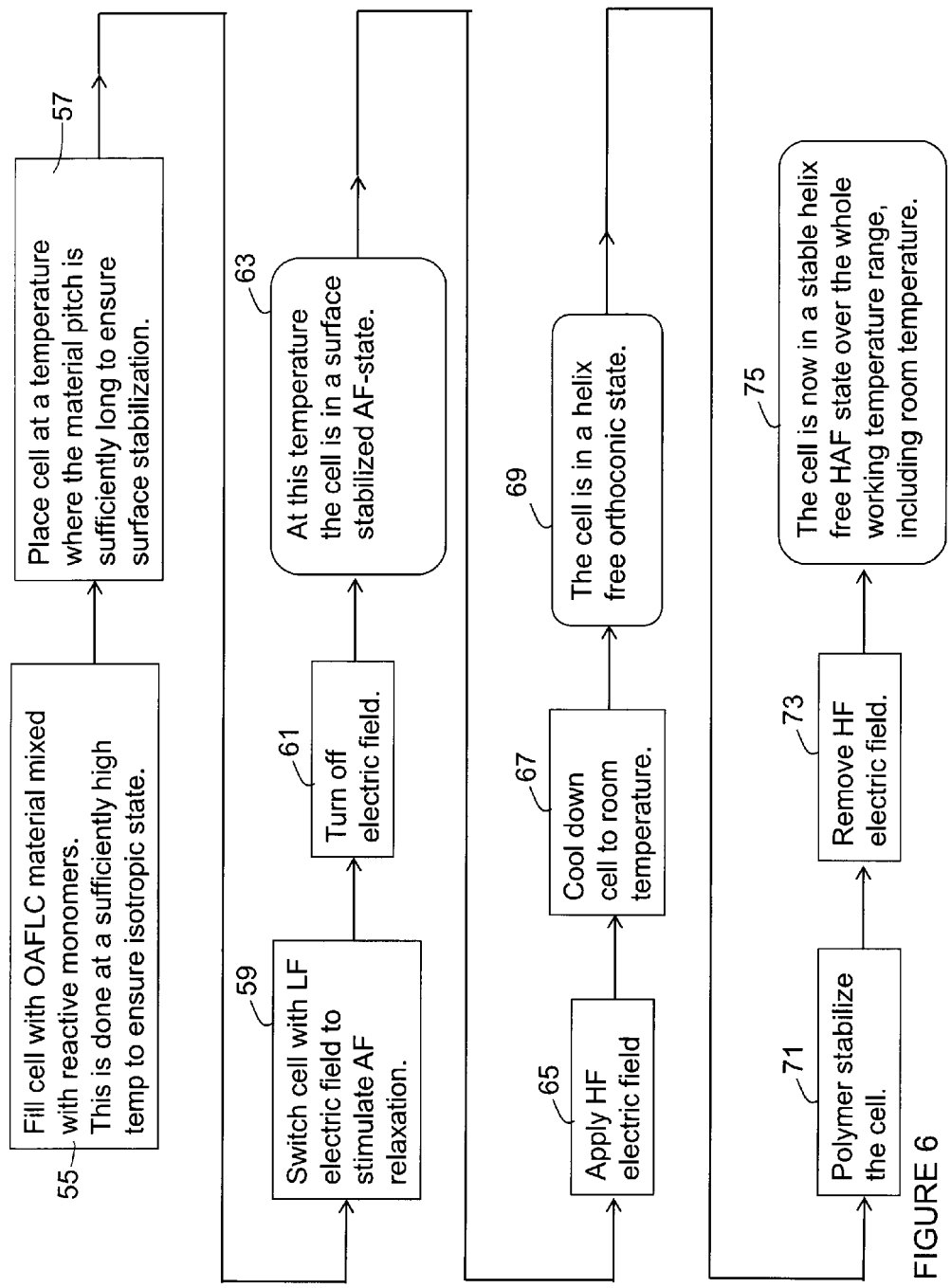
FIG. 6 is a flow diagram depicting example operations for surface stabilization at a high temperature, polymer stabilize at another temperature while a high frequency electric field may be applied.

FIG. 6 illustrates example operations for surface stabilization at a high temperature, polymer stabilize at another temperature while a high frequency electric field may be applied. First, the cell may be filled with OAFLC material mixed with reactive monomers (55). This may be performed at sufficiently high temperatures to ensure the isotropic state, for example 130° C. Thereafter, the cell may be placed at a temperature where the material pitch is sufficently long to ensure surface stabilization (57), for example 75° C. Then, the cell may be switched with a low frequency electric field to stimulate AF relaxation (59). The electric field may thereafter be turned off (61). At this temperature, the cell may be in a surface stabilized HAF state (63). Thereafter, a high frequency electric field may be applied (65). The cell may thereafter be cooled down to room temperature (67). The high frequency field may further stabilize the helix-free HAF state. The cell may now be in a helix free orthoconic state (69). The cell may thereafter be polymer stabilized (71). Upon polymer stabilization, the high frequency electric field may be removed (73). The cell may thereafter be in a stable helix free HAF state over the entire working temperature range, including room temperature regardless of whether or not an electric field is being applied (75).

The foregoing description of the example embodiments have been presented for purposes of illustration and description. The foregoing description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that any of the example embodiments presented herein may be used in conjunction, or in any combination, with one another.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Some example embodiments may comprise a portable or non-portable telephone, media player, Personal Communications System (PCS) terminal, Personal Data Assistant (PDA), laptop computer, palmtop receiver, camera, television, and/or any appliance that comprises a transducer designed to transmit and/or receive radio, television, microwave, telephone and/or radar signals.

The various example embodiments described herein are described in the general context of method steps or processes, which may be implemented in one aspect by a computer program product, embodied in a computer-readable medium, including computer-executable instructions, such as program code, and executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

REFERENCES

[1] K. D'havé et al., Antiferroelectric liquid crystals with 45° tilt—a new class of promising electro-optic materials, Ferroelectrics 2000, vol. 244, pp 115-128
[2] K. D'havé et al., Solution of the dark state problem in antiferroelectric liquid crystal displays, Applied Physics Letters 2000, vol. 76, pp 3528-3530
[3] S. Lagerwall et al., Unique electro-optical properties of liquid crystals designed for molecular optics, Advanced Functional materials 2001, vol. 11, pp 87-94
[4] R. Dabrowski et al., U.S. Pat. No. 6,919,950 B2, Jul. 19, 2005
[5] P. Rudquist et al., Polymer-stabilized Orthoconic Antiferroelectric Liquid Crystals, Ferroelectrics 2006, vol. 344, pp 177-188

The invention claimed is:

1. A method for securing a stabilization of a liquid crystal device, the liquid crystal device comprising an antiferroelectric liquid crystal material having smectic layers, and two substrates confining said antiferroelectric liquid crystal material, the method comprising:
  introducing a stabilization agent to the antiferroelectric liquid crystal material;
  stabilizing the antiferroelectric liquid crystal material with the stabilization agent; and
  inducing a stabilized orthoconic state wherein the antiferroelectric liquid crystal is uniaxial negative and comprises an optic axis perpendicular to the substrates;
  wherein a relationship between the helix pitch and a stabilizing temperature is altered as a function of the induced stabilization.

2. The method of claim 1, wherein the introducing further comprises introducing the stabilization agent in the form of a reactive monomer.

3. The method of claim 2, wherein the stabilizing further comprises chemical crosslinking of the reactive monomer at a selected temperature in which the antiferroelectric liquid crystal material is surface stabilized.

4. The method of claim 2, wherein the stabilization further comprises chemical crosslinking of the reactive monomer at a selected temperature in which the selected temperature is lower than a temperature at which the antiferroelectric liquid crystal material is surface stabilized.

5. The method of claim 1, wherein the introducing further comprises introducing the stabilization agent in the form of an electric field comprising a field of a higher frequency than a cut off frequency of an antiphase fluctuation of the antiferroelectric liquid crystal material.

6. The method of claim 5, further comprising introducing an additional stabilization agent in the form of a reactive monomer, wherein the stabilization further comprises chemical crosslinking of the reactive monomer during application of the electric field.

7. The method of claim 6, wherein the application of the electric field further comprises applying the electric field during a cooling from a temperature at which the antiferroelectric liquid crystal is surface stabilized to a selected temperature at which the crosslinking of the reactive monomer is performed, wherein the applied electric field comprises a higher frequency than a cut off frequency of an antiphase fluctuation of the antiferroelectric liquid crystal material.

8. The method of claim 6, wherein the stabilization further comprises providing a global energy minimum in the antiferroelectric liquid crystal material, wherein the liquid crystal device remains stabilized after the electric field is removed.

9. The method of claim 1, wherein the inducing further comprises inducing an effectively tri-stable condition in the antiferroelectric liquid crystal material.

10. The method of claim 1, wherein the stabilizing further comprises locally stabilizing the antiferroelectric liquid crystal material.

11. The method of claim 1, wherein the liquid crystal device comprises a cell thickness within a range of 0.5 μm-20 μm.

12. The method of claim 1, wherein the liquid crystal device comprises a cell thickness within a range of 0.5 μm-5 μm.

13. The method of claim 1, wherein the liquid crystal device comprises a cell thickness within a range of 5 μm-20 μm.

14. A liquid crystal device, the liquid crystal device comprising an antiferroelectric liquid crystal material having smectic layers, and two substrates confining said antiferroelectric liquid crystal material, the liquid crystal device comprising:
  a stabilization agent, said stabilization agent being introduced to the antiferroelectric liquid crystal material for stabilization;
  wherein said stabilization induces a stabilized orthoconic state wherein the antiferroelectric liquid crystal is uniaxial negative and comprises an optic axis perpendicular to the substrates; and
  wherein a relationship between the helix pitch and a stabilizing temperature is altered as a function of the induced stabilization.

15. The liquid crystal device of claim 14, wherein the liquid crystal device comprises a cell thickness within a range of 0.5 μm-20 μm.

16. The liquid crystal device of claim 14, wherein the liquid crystal device comprises a cell thickness within a range of 0.5 μm-5 μm.

17. The liquid crystal device of claim 14, wherein the liquid crystal device comprises a cell thickness within a range of 5 μm-20 μm.

18. The liquid crystal device of claim 14, wherein the stabilization agent is in the form of a reactive monomer.

19. The liquid crystal device of claim 18, wherein the reactive monomer is chemically cross-linked at a selected temperature in which the antiferroelectric liquid crystal material is surface stabilized.

20. The liquid crystal device of claim 18, wherein the reactive monomer is chemically cross-linked at a selected temperature in which the selected temperature is lower than a temperature at which the antiferroelectric liquid crystal material is surface stabilized.

21. The liquid crystal device of claim 14, wherein the stabilization agent is introduced in the form of an electric field comprising a field of a higher frequency than a cut off frequency of an antiphase fluctuation of the antiferroelectric liquid crystal material.

22. The liquid crystal device of any of claim 21, wherein an additional stabilization agent in the form of a reactive monomer is introduced, wherein the reactive monomer is chemically cross-linked during application of the electric field.

23. The liquid crystal device of claim 22, wherein the electric field is applied during a cooling from a temperature at which the antiferroelectric liquid crystal is surface stabilized to a selected temperature at which the chemical crosslinking of the reactive monomer is performed, wherein the applied electric field comprises a higher frequency than a cut off frequency of an antiphase fluctuation of the antiferroelectric liquid crystal material.

24. The liquid crystal device of claim 22, wherein the antiferroelectric material is stabilized such that a global energy minimum in the antiferroelectric liquid crystal material is provided, wherein the liquid crystal device remains stabilized after the electric field is removed.

25. The liquid crystal device of claim 22, wherein the induced stabilized orthoconic state further comprises an effectively tri-stable condition in the antiferroelectric liquid crystal material.

26. The liquid crystal device of claim 14, wherein the induced stabilized orthoconic state is a locally induced stabilized state of the antiferroelectric liquid crystal material.

* * * * *